United States Patent Office 3,723,146
Patented Mar. 27, 1973

3,723,146
RETARDED GYPSUM PLASTER FOR USE IN LONG SET AGGREGATE MORTAR APPLICATIONS
Marvin K. Lane, Chicago, Ill., assignor to United States Gypsum Company, Chicago, Ill.
No Drawing. Original application Apr. 1, 1969, Ser. No. 812,371, now Patent No. 3,652,309. Divided and this application Aug. 12, 1971, Ser. No. 171,379
Int. Cl. C04b 11/00
U.S. Cl. 106—110     2 Claims

ABSTRACT OF THE DISCLOSURE

The process of making a gypsum plaster possessing a high degree of stability over extended periods of time and having a set time of at least 4 hours in aggregated mortar application by providing a specially sized calcined gypsum having a particle size that is essentially all finer than 32 microns, and mixing said specially sized gypsum with retarder, accelerator and other additives to give the desired properties when mixed with water and aggregate.

---

This application is a divisional application of my copending application Ser. No. 812,371 filed on Apr. 1, 1969, now U.S. Pat. No. 3,652,309.

This invntion relates to the preparation of a gypsum plaster exhibiting increased resistance to aging during storage by using a specially sized calcined gypsum plaster that is essentially free of plus 32 micron particles.

Currently manufactured retarded and formulated gypsum plaster made by atmospheric calcination has a rather high mortar consistency when used with an aggregate such as sand or perlite. When aggregated mortar pastes made from this gypsum plaster are awaiting application by hand or by pumping through a machine, they manifest severe stiffening, making it very difficult to control and predict the set, dried density after application. Furthermore, the mortar consistency of this gypsum plaster drops with age during storage for long periods of time. The aggregated mortar paste made from this "aged" gypsum plaster becomes lean, dead, sandy and sticky, and it has poor working qualities and poor sand-coating and sand-carrying ability under a trowel.

Current gypsum plaster made by atmospheric calcination contains about 40% by weight of particles larger than 32 microns. I have discovered that by size- classifying the gypsum plaster to produce a specially sized gypsum plaster have 0% to 10% by-weight of particles larger than 32 microns, the plaster will give a lower mortar consistency, will manifest only very slight stiffening, will drop only very slightly in mortar consistency with "aging" and will not develop poor working qualities and poor sand-coating and sand-carrying ability with "aging" during long periods of storage.

Atmospherically calcined gypsum hemihydrate is used in long-set, aggregated mortar mixes that are applied and formed either by hand trowel or by a machine spray device and allowed to set and dry. Generally, these are the basecoat type applications, but this invention is not limited thereto.

Calcined gypsum hemihydrate intended for this use is formulated with proteinaceous retarder, some type of accelerator as a set stabilizer and other miscellaneous ingredients added to impart specified properties and then bagged, shipped and stored. This type of bagged, formulated, calcined gypsum hemihydrate is commonly known in the industry as gypsum plaster or machine applied gypsum plaster and it gives about a 4 to 6 hour set in an aggregated mortar mix. At a later date, the gypsum plaster is mixed with water and aggregate and is applied. The aggregate is generally sand or perlite and the ratio of aggregate to gypsum plaster in the mortar mix with water is between 2:1 and 4:1 depending on the application. This mix is stirred by hand or by machine and brought to a paste-like fluidity by incremental additions of water. An aggregated mortar paste fluidity is defined by ASTM test procedure No. C-472-61 using the modified Vicat plunger and a penetration of 20 min. ±3 min. This aggregated mortar paste is then gradually applied by hand during a period of about an hour or more; or it is applied through a pump, long hose and spray device.

In the case of hand application, an aggregated mortar slurry will tend to "buck" as it is called in the trade. This refers to a stiffening, or thickening, of the paste during standing while it is being applied with a hod and trowel. When this occurs, it is necessary to add water to bring the fluidity back to the desired mortar consistency so that it can still be applied smoothly and easily. In the case of machine spray application, these aggregated mortar slurries stiffen very rapidly as they pass through the hose and, if the change in fluidity is very large, it is very difficult to maintain control and to spray smoothly.

Another drawback of gypsum plaster as its susceptibility to "aging" during storage. This "aging" is magnified and accelerated by a humid environment. "Aging" consists of two changes: first, the gypsum plaster develops a lower mortar consistency and, second, it becomes poor-working, lean, and sticky under a trowel, and it is no longer able to coat and carry very coarse sand particles. If this "aged" material is machine-applied, the sand separates in the hose, and this results in plugging.

It would be advantageous for an aggregated mortar mix made from fresh gypsum plaster to have a lower mortar consistency.

Furthermore, it would be advantageous if the aggregated mortar fluidity, once measured, could be maintained constant during application; i.e., the mortar would not stiffen or "buck."

It would also be advantageous if the fresh gypsum plaster maintained a constant mortar consistency during storage in bags prior to use. Also, it would be advantageous if it maintained its richness and trowelability and sand-coating and sand-carrying ability during storage.

It is an object of this invention, therefore, to provide a fresh formulated, retarded gypsum plaster that has a lower mortar consistency when mixed with 2 to 4 parts of aggregate per part of plaster, as measured by the modified Vicat apparatus, than heretofore possible, and still has good richness, trowelability and sand-coating and carrying ability.

A further object of this invention is to provide a fresh formulated, retarded gypsum plaster which, after it is once mixed to a mortar consistency with aggregate in readiness for hand trowel application and forming, maintains about the same fluidity throughout the period of about an hour, which is about the time required for application, without stiffening, bucking or requiring additional water.

A still further object of this invention is to provide a fresh gypsum plaster that, after mixing to a mortar consistency with aggregate, maintains a constant fluidity as it passes through a pump, hose and spray device during machine spray application and forming.

A further object of this invention is to provide a gypsum plaster that, during storage for long periods of time prior to mixing with water and aggregate for application, drops only very slightly in mortar consistency.

Another object of this invention is to provide a gypsum plaster that during storage for long periods of time prior to mixing with water and aggregate for application and forming does not develop leanness, stickiness, nor poor workability under a trowel, and does not lose sand-coating and sand-carrying ability.

It is a further object of this invention to provide all of the above described improvements by size-classifying to give an atmospherically calcined gypsum hemihydrate plaster that is essentially free of plus-32-micron particles.

This invention is based on the discovery that dry particles of freshly calcined gypsum plaster "dispersed" or disintegrate in water during mixing. The presence of an aggregate, such as sand or perlite, promotes this disintegration. Disintegration in the presence of an abrasive aggregate is very rapid and fully completed in a very short time, even though mixing is mild. This disintegration phenomenon is discussed in detail, as it applied to sanded mortars, in an article published in Rock Products, March and April 1968, entitled, "Disintegration of Plaster Particles in Water."

The particles in plaster made by calcining atmospherically are very strained and fissured. When these particles are added to water and stirred, they break down into extremely fine fragments. The larger plaster particles (over 32 microns) are more strained and more fissured, and break down more easily and rapidly. The smaller plaster particles (below 32 microns) have more crystalline integrity and do not break down as easily. When plaster "ages," the strain on the larger particles diminishes and the fissures heal. As a result, these particles disintegrate to a lesser degree after "aging" and, if aging is severe enough, they may lose nearly all their disintegrability.

The larger particles in gypsum plaster are, therefore, quite unstable with respect to the viscosity, sand-coating ability, richness and age-stability of an aggregated mortar paste.

In order to understand and interpret the relationship between plaster particle fineness and the physical properties of the aggregated mortar slurries, the particle size of the fully disintegrated plaster must be considered as well as the particle size of the dry plaster.

The "bucking" or stiffening of an aggregate mortar paste is caused by the turnover from very coarse particles to very fine fragments during stirring and/or standing. The greater the extent of this turnover, or the greater the net transition in fineness, the more the paste will "buck" or stiffen.

The richness, trowelability, sand-coating and sand-carrying ability depends on the quantity of very fine fragments that are made available in the mortar paste by the full disintegration of the particles. More fine fragments impart improved richness, improved trowelability and improved sand-carrying and sand-coating ability.

However, if a mortar paste of aggregate and plaster relies on full disintegration for the fine fragments of plaster that are required, then upon "aging," the mortar paste becomes very lean and dead, lacking in sand-carrying ability, because the plaster has lost most of its disintegrability.

The object of this invention, then, is to improve atmospherically calcined gypsum plaster by removing essentially all of these very unstable plus-32-micron particles with an air-classifier in a closed circuit. This will give an age-stable, rich plaster that manifests very little stiffening, has a lower mortar consistency and has good sand-carrying and sand-coating ability.

The following examples will demonstrate the effectiveness of my invention. A typical kettle-calcined gypsum plaster, having about 40% by weight of particles larger than 32 microns, was size-classified at 32 microns giving a fine cut having no plus-32-micron particles and a coarse cut having 70% plus-32-micron particles. After size classifying, the cuts each had a conventional retarder and accelerator mixed therein by conventional mixing apparatus. In the following experiments these two cuts were compared to the typical material.

EXAMPLE 1

Three fresh plasters, two of special sizing and one of typical sizing, were measured for mortar consistency using 2½ parts of No. 1 Torpedo sand per part of plaster, by means of the standard ASTM modified Vicat apparatus and procedure, designation No. C-472-61. This method consists of charging a dry mix of retarded (4-hr.) plaster and sand to a measured amount of water in a stirring pan, stirring with a spatula at 60 rotations a minute, forming a patty of given dimensions and allowing the modified Vicat plunger to drop through the mortar paste from a given height. A penetration of 20 min. ±3 min. is considered to be a mortar fluidity (consistency).

Since these mortar mixes stiffen with stirring and/or standing, different degrees of stirring, other than 60 rotations, or different times of standing, will give different "mortar" consistencies by this test. The test can therefore be used to measure stiffening quantitatively by obtaining a series of "mortar" consistencies at different degrees of stirring and/or standing times on the same mix with additional increments of water. These figures are shown in Table 1.

TABLE 1.—SIZING, STIFFENING, AND WORKING PROPERTY DATA FOR FRESH, KETTLE-CALCINED PLASTER IN SANDED MORTAR

|  | Specially sized plaster with 70% larger than 32 microns | Current typically sized plaster with about 40% larger than 32 microns | Specially sized plaster with 0% larger than 32 microns |
|---|---|---|---|
| (1) Mortar consistency, cc. per 100 g. of plaster (with 2½ parts of sand), after 4 to 5 stirs with spatula, ml. | App. 74 | 73 | 67. |
| (2) Astm mortar consistency, cc. per 100 g. of plaster (with 2½ parts of sand), after 60 to 80 stirs with spatula, ml. | 82 | 80 | 73. |
| (3) Mortar consistency, cc. per 100 g. of plaster (with 2½ parts of sand), after continual vigorous stirring and replenishing with water as mix stiffens until maximum equilibrium consistency is reached, ml. | 110 | 110 | 88. |
| Potential stiffening range, cc. per 100 g. of plaster, with stirring, ml: |  |  |  |
| (3) Minus (2) | +28 | +30 | +15. |
| (3) Minus (1) | +36 | +37 | +21. |
| Mortar consistency, cc. per 100 g. of plaster (with 2½ parts of sand), after standing for 1½ hours, ml. | 100 | 90 | 77. |
| Actual stiffening while standing, cc. per. 100 g. of plaster (with 2½ parts of sand), ml. | +26 | +17 | +10. |
| Mean particle size of dry plaster, microns | 45 | 24 | 7. |
| Mean particle size of fully-disintegrated plaster, microns | 1.1 | 1.2 | 2.2. |
| Particles smaller than 1 micron in dry plaster, wt. percent | .05 | 2 | 5. |
| Particles smaller than 1 micron in fully-disintegrated plaster, wt. percent | 45 | 43 | 32. |
| Specific blaine surface area of dry plaster, sq. cm. per g. | 2,000 | 8,500 | 12,000. |
| Specific blaine surface area of fully-disintegrated plaster, sq. cm. per g. | 30,200 | 30,000 | 27,000. |
| Working quality under a trowel | Rich, fast soaking coats sand, very rapid "bucking". | Rich, fast soaking, coats sand, rapid "bucking". | Rich, fast soaking, coats sand, mild "bucking". |

In many applications of hand-applied aggregated mortar mixes very little actual stirring is done. Therefore, the first "mortar" consistency tabulated in Table 1 is that measured with just 4 or 5 stirs. The standard ASTM value for 80 stirs is shown next. This simulates more closely a machine mix consistency prior to pumping through a long hose and spray device. The maximum "mortar" consistency is an equilibrium value achieved by stirring at least 1000 rotations. "Mortar" consistencies will approach this value during the time the mortar mix is traveling through a pump, long hose and spray device.

The accompanying particle size data of the plaster, dry and fully disintegrated, are also shown in Table 1. The last item in Table 1 is a description of the working quality and sand-carrying ability of the mortar mixes made from the three different sizings of plaster.

Data in this table show that stiffening in a sanded mortar mix is related to the net transfer from very coarse particles to very fine fragments during the plaster particle disintegration. The very coarse cut, containing 70% by weight of particles larger than 32 microns in the dry condition is the worst stiffener. Typical gypsum plaster, having 40% by weight of particles larger than 32 microns, shows less stiffening. The fine cut, with no plus-32 micron particles shows only slight stiffening, by comparison. However, the fine cut does disintegrate to a certain extent in the mortar mix, but the net fineness change or turnover, is very small. All three fresh samples of sized plaster produce sufficient fine fragments to impart richness and sand-coating and sand-carrying ability. The fine cut does not give as many fine fragments and therefore has a lower initial mortar consistency.

In a field trial, the minus-32-micron fine cut was preferable due to its very low stiffening range, lower mortar consistency and richness and trowelability.

EXAMPLE 2

Three samples of retarded gypsum plasters, representing different particle sizings, were "aged" by exposing them to 90° F., 65% relative humidity environment for 10 days. Then, mortar tests were repeated and side-by-side comparisons were made with the original samples that had been kept fresh by sealing them in vapor proof bags. Fully disintegrated fineness tests were run again on the "aged" samples. Data are shown in Table 2.

None of the three "aged" samples manifested stiffening because during the "aging" period the larger, disintegrable particles over 32 microns in size healed and lost essentially 80% of their ability to disintegrate in the water. In the mortar mix, therefore, there was very little fineness change from dry to disintegrated. The finess in the mortar mixes was therefore about the same as the dry fineness, after aging.

This loss of disintegrability with "aging" caused the largest change in the mortar properties of the coarse sizing of plaster (70% plus-32-microns by weight) and of the typical sizing of plaster (40% plus-32-microns by weight), because these plasters contained the largest quantity of the unstable plus-32-micron particles. The fine sizing of plaster (0% plus-32-microns by weight) changed only slightly with "aging." This fine sizing of plaster was quite fine in the dry state and disintegrated slightly when it was fresh. After "aging," it was still quite fine in the dry state and still disintegrated slightly.

The coarse sizing and typical sizing of plaster showed a large drop in mortar consistency with "aging." The fine sizing of plaster maintained about the same mortar consistency with "aging."

The coarse sizing and typical sizing of plaster became very dead, very lean and very poor working under a trowel in a motar mix after "aging." The sand was bare and uncoated causing grittiness and stickiness after "aging." The fine sizing of plaster was, however, still rich, very workable and still had good sand-coating and sand-carrying ability after "aging" because it still disintegrated slightly and supplied sufficient fine fragments to impart these favorable properties.

What is claimed is:

1. A dry gypsum product of especial utility in slow-set aggregated mortars consisting essentially of the fraction of kettle-calcined gypsum having a particle size distribution the top size of which does not exceed about 32 microns.

2. A dry gypsum product of especial utility in slow-set aggregated mortars comprising kettle-calcined gypsum having a particle size distribution the top size of which does not exceed about 32 microns, said gypsum product being essentially free of any kettle-calcined gypsum having particles the size of which exceeds about 32 microns.

TABLE 2.—SIZING AND AGING OF KETTLE-CALCINED FORMULATED PLASTER IN A SANDED MORTAR

| | Specially sized plaster with 70% larger than 32 microns | | Current typically sized plaster with about 40% larger than 32 microns | | Specially sized plaster with 0% larger than 32 microns | |
|---|---|---|---|---|---|---|
| | Fresh | Aged | Fresh | Aged | Fresh | Aged |
| Mortar consistency, ml. per 100 g. of plaster (with 2½ parts of sand), after 4 to 5 stirs with spatula, ml. | App. 76 | 65 | 73 | 65 | 67 | 63. |
| Aging drop, ml | | −11 | | −8 | | −4. |
| ASTM mortar consistency, ml. per 100 g. of plaster (with 2½ parts of sand), after 60 to 80 stirs with spatula, ml. | 82 | 68 | 80 | 68 | 73 | 68. |
| Aging drop, ml | | −14 | | −12 | | −5. |
| Working quality under a trowel | Rich, fast soaking, coats sand, very rapid bucking. | Lean, slow soaking, sand bare, dewater. | Rich, fast soaking, coats sand, rapid bucking. | Lean, slow soaking, sand fairly bare, dewater. | Rich, fast soaking, coats sand, mild bucking. | Rich, fast soaking, coats sand, no bucking. |
| Aging change | | Became very dead, lean. | | Became dead, lean. | | Stayed rich. |
| Fully-disintegrated mean particle size, microns | 1.1 | 30 | 1.2 | 18 | 2.2 | 4. |
| Fully-disintegrated particles smaller than 1 micron, wt. percent. | 45 | 2 | 43 | 5 | 32 | 28. |

References Cited

UNITED STATES PATENTS

| | | | |
|---|---|---|---|
| 3,445,323 | 5/1969 | Schnabel | 106—110 |
| 3,359,146 | 12/1967 | Lane et al. | 106—110 |
| 3,328,121 | 6/1967 | Shull | 106—110 |
| 3,305,518 | 2/1967 | Jakacki et al. | 106—110 |
| 3,303,030 | 2/1967 | Preston | 106—110 |
| 3,574,648 | 4/1971 | Wirsching et al. | 106—110 |
| 3,305,375 | 2/1967 | Jakacki | 106—110 |

JAMES E. POER, Primary Examiner